May 18, 1965 A. W. STANDAART 3,184,713

CHANGEABLE STORAGE DEVICE FOR STORING PROGRAM REPRESENTING PATTERNS OF CONNECTIONS

Filed Nov. 8, 1960 4 Sheets-Sheet 1

INVENTOR

Adrian W. Standaart

BY Mason, Fenwick & Lawrence

ATTORNEYS

INVENTOR
Adrian W. Standaart

BY Mason, Fenwick & Lawrence
ATTORNEYS

INVENTOR
Adrian W. Standaart

BY Mason, Fenwick & Lawrence
ATTORNEYS

INVENTOR
Adrian W. Standaart

BY Mason, Fenwick & Lawrence
ATTORNEYS

United States Patent Office 3,184,713
Patented May 18, 1965

3,184,713

CHANGEABLE STORAGE DEVICE FOR STORING PROGRAM REPRESENTING PATTERNS OF CONNECTIONS

Adrian W. Standaart, Winston-Salem, N.C.

Filed Nov. 8, 1960, Ser. No. 68,109
5 Claims. (Cl. 340—147)

The present invention relates in general to data storage systems, and more particularly to electromechanical memory appratus for storing a large group of patterns or programs of connections between exit and entry hubs of an electronic computer control panel or plugboard, wherein the stored patterns or programs may be readily changed to other desired programs.

Heretofore, in the wiring of an electronic computer or electronic data processing machine to condition it to a selected computer program, it has been necessary to manually connect a jumper wire or jack connector wire between a large number of sets of exit and entry hubs of the plugboard or control panel. Since both the group of exit and entry hubs of the usual computer normally have at least one hundred hubs each, it will be apparent that the wiring of the computer in accordance with a particular program or to change programs involves a tremendous amount of time and labor.

An object of the present invention is the provision of a novel selective memory system by which selected groupings or combinations of electrical circuit connections or conditions may be stored.

Another object of the present invention is the provision of a novel combination storage or memory system which is capable of recording or storing selected combinations or programs of electrical circuit connections, wherein the combinations or programs may be readily changed to other desired programs.

Another object of the present invention is the provision of a selective memory system by which selected groupings or programs of electrical circuits to be established between the exit and entry hubs of electronic computers representing a selected computer program may be set up and recorded to retain such program of connections and wherein the program may be readily erased and new programs recorded as desired.

Other objects, advantages and capabilities of the present invention will become apparent from the following detailed description, taken in conjunction with the accompanying drawings, wherein only a preferred embodiment is shown.

Figure 1:
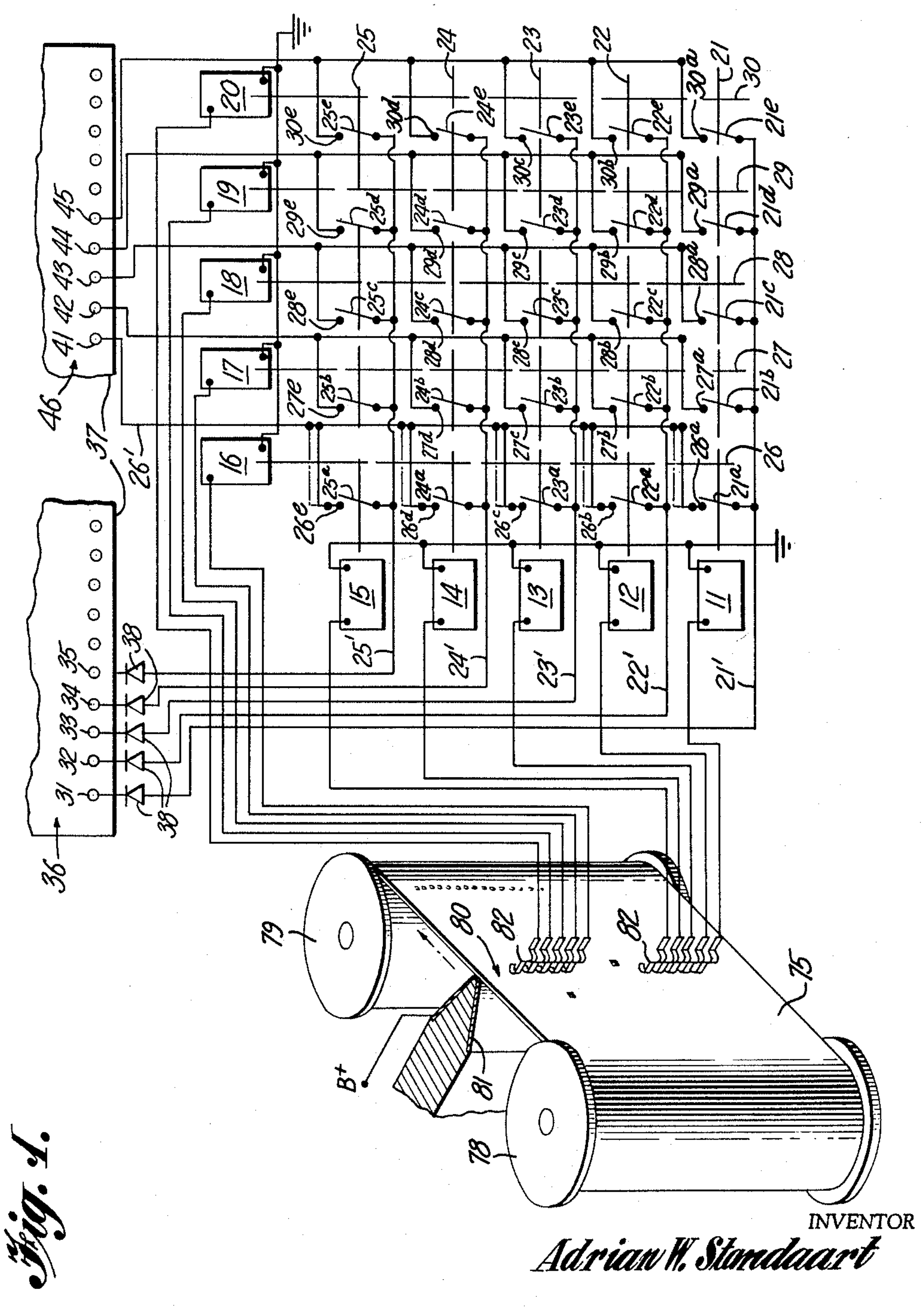
FIGURE 1 is a schematic diagram of the electromechanical memory system embodying the present invention, the paper tape sensing means for setting up a selected program in the memory apparatus being indicated only in sufficient detail to illustrate the setting and recording of a single grouping or program.

The present invention in general comprises a selective control system which may include a program control component containing a permanent record of exit and entry hub connections for a variety of different electronic computer or automatic data processing equipment programs, and an electromechanical storage device having a network of contact pairs which are normally maintained in open circuit condition. One contact member of each contact pair in a rectilinearly aligned series of contacts along one axis is connected with a single exit hub of the group of exit hubs of the control panel, and the other contact member of each pair of this aligned series of contacts is connected to a different one of the entry hubs. The number of aligned series or groups of contacts corresponds to the number of exit hubs and the number of contact pairs in each series corresponds to the number of entry hubs, or vice-versa. Solenoid or relay coils are provided to control each set of contact members associated with one of the exit hubs and contact members of each set associated with one of the entry hubs, to selectively close sets of these contacts and record or store connection conditions between exit and entry hubs as long as the closed contact condition persists. These solenoid or relay coils are under control of suitable sensors for detecting conditions recorded in a suitable permanent record tape, such as electrical contact sensors coacting with paper tape which project through punch holes at selected locations in the tape and complete an electrical circuit. The paper tape, or punch cards if desired, may have punch holes representing the pattern or program of exit and entry hub connections for many different computer programs, so that it will only be necessary to subject the sensors to the punch holes in the section of tape representing a particular desired computer program to condition the electromechanical storage device to record that program and establish the proper sets of exit and entry hub connections.

The present invention will be more clearly understood from the following detailed description referring particularly to the drawings, wherein like reference characters designate corresponding parts throughout the several figures thereof. In the embodiment illustrated, the sets of contacts of the electromechanical storage or memory device for only five exit hubs and five entry hubs have been shown, in which case the device will be capable of retaining only twenty-five different exit and entry hub connections. It is to be understood, however, that either or both the exit associated contacts and the entry associated contacts can be multiplied indefinitely, with a corresponding increase in the retentive capacity of the system.

Referring particularly to the drawings (FIGS. 1 and 4), the selective control system of the present invention includes as the mechanism for storing or recording by establishing certain electrical contact conditions the connections between exit hubs and entry hubs of a computer or automatic data processing device constituting the computer program, an electromechanical storage device indicated generally by the reference character 10. The electromechanical storage device includes a plurality of entry contact shifting relays 11, 12, 13, 14 and 15 controlling a series of contacts 21 to 25 respectively. Each of the series of contacts 21 to 25 as indicated in the schematic circuit diagram, consists of a plurality of contact members arranged in rows or columns along the working or control axes indicated by the broken lines extending from each of the relay coils and denoted by ascending alphabetical suffixes progressing away from the relay coil, for example 21*a* to 21*e*. Each of the contact members 21*a*–21*e*, 22*a*–22*e*, 23*a*–23*e*, 24*a*–24*e*, 25*a*–25*e* are normally disposed in open circuit relation with an associated contact in the series of contacts denoted by the reference characters 26 to 30. The series of contacts 26 to 30 are arranged for operation along working or control axes perpendicular to the working axes of the series of contacts 21 to 25 and are controlled by exit contact shifting relays 16 to 20. As in the case of the contacts making up the series of contacts 21 to 25, the contact members of the series of contacts 26 to 30 are likewise identified by alphabetical suffixes, as for example the contact members 26*a*, 26*b*, 26*c*, 26*d* and 26*e* in the first series of contacts 26 at the left-hand side of the contact network illustrated in FIGURE 1. Each of the contact members of each individual series of contacts are electrically connected together and are then connected to a separate one of the entry hubs 31 to 35 of the group of entry hubs 36 of the control or program panel 37 of an electronic computer or data processing apparatus through a unidirectional diode 38. For example, each of the contact members 21*a*, 21*b*, 21*c*, 21*d* and 21*e* are electrically connected together and are connected by lead 21′ through one of the diodes 38 with the number one entry hub 31. In similar manner, the contact members 22*a* to 22*e* are electrically connected to each other and are connected through lead 22′ to entry hub 32. Similarly, the contact members of each individual series of contacts 26 to 30 are electrically connected in common with each other and to a respective one of the exit hubs 41 to 45 of the group of exit hubs 46 of the electronic computer control panel 37. For example, the contact members 26*a* to 26*e* are electrically connected to each other and are connected through lead 26′ directly to the number one exit hub 41. The contacts 26*a*–26*e*, 27*a*–27*e*, 28*a*–28*e*, 29*a*–29*e* and 30*a*–30*e* are hereinafter sometimes termed exit contact members and the contacts 21*a*–21*e*, 22*a*–22*e*, 23*a*–23*e*, 24*a*–24*e* and 25*a*–25*e* are termed entry contact members.

The physical arrangement of the contacts is such that the contact members comprising any of the series of exit contact members 26 to 30 may be moved substantially rectilinearly along their control axes, identified by the broken lines extending from the exit contact shifting relays 16 to 20, toward their associated relays 16 to 20, or rectilinearly upwardly toward the top of the figure as viewed in FIGURE 1, on energizing the associated control relays 16 to 20. These exit contact members 26–30 normally lie in the path of movement of the free ends of entry contact members 21–25. The entry contact members 21 to 25 are arranged for pivotal movement toward their associated control relays 11 to 15. The various series of contact members will be spring biased or otherwise arranged in a conventional manner to return in a direction away from their associated control relays upon deenergization of the relays.

It will be apparent, therefore, that upon energization of one of the entry contact shifting relays 11 to 15, for example the relay 11, the entire series of contact members controlled thereby, namely the contact members 21*a* to 21*e* in the example, will be pivoted in the direction of the relay 11 and against their associated contacts 26*a*, 27*a*, 28*a*, 29*a* and 30*a*. If one of the exit contact shifting relays, for example the relay 16, is then energized, its associated series of contact members 26*a* to 26*e* will be shifted rectilinearly transversely to the control axes of the relays 11 through 15, which is upwardly toward the top of the figure as viewed in FIGURE 1, permitting the pivoted entry contact member 21*a* to pass to the left beyond the end of its related exit contact member 26*a*. Upon deenergizing of the exit contact shifting relay 16, the series of contact members 26*a* to 26*e* will return to their initial positions under a resilient bias, wherein they return to their normal position in the path of movement of the entry contact members 21–25. If, thereafter, the entry contact shifting relay 11 is deenergized and its controlled series of contact members 21*a*–21*e* are urged under their resilient bias to their normal or open circuit condition with their related contact members 26–30, the entry contact member 21*a* will be restrained in circuit making engagement with the exit contact member 26*a* which has been returned into the path of return movement of the entry contact member 21*a*. However, since the remaining exit contact members 27*a*–30*a* associated with the entry contact members 21*b*–21*e* were not withdrawn from the path of advancing movement of their related entry contact members approaching the relay 11, so that these entry contact members were not permitted to pass to the left beyond their related exit contact members, the entry contact members 21*b* to 21*e* are free to return to open circuit condition relative to the exit contact members 27*a*–30*a*.

Figure 5:
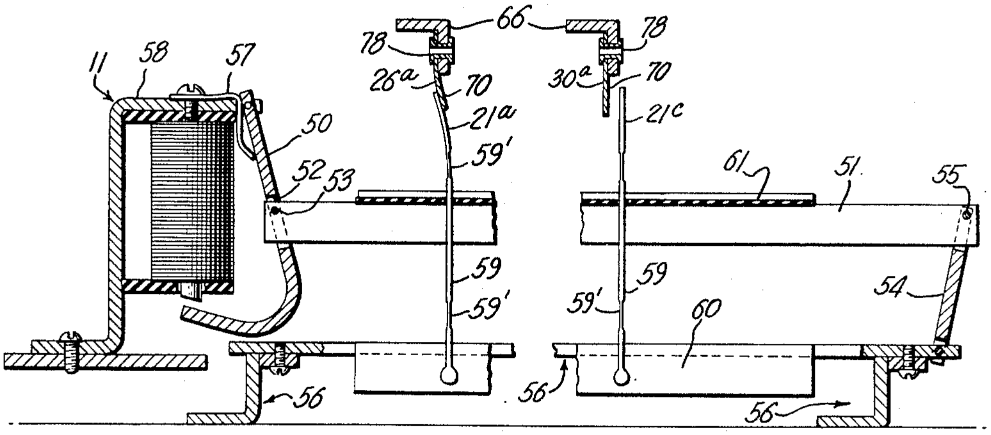
FIGURE 5 is a vertical transverse sectional view of the electromechanical storage mechanism taken along the lines 5—5 of FIGURE 3, with certain background parts omitted for clarity.
Figure 3:
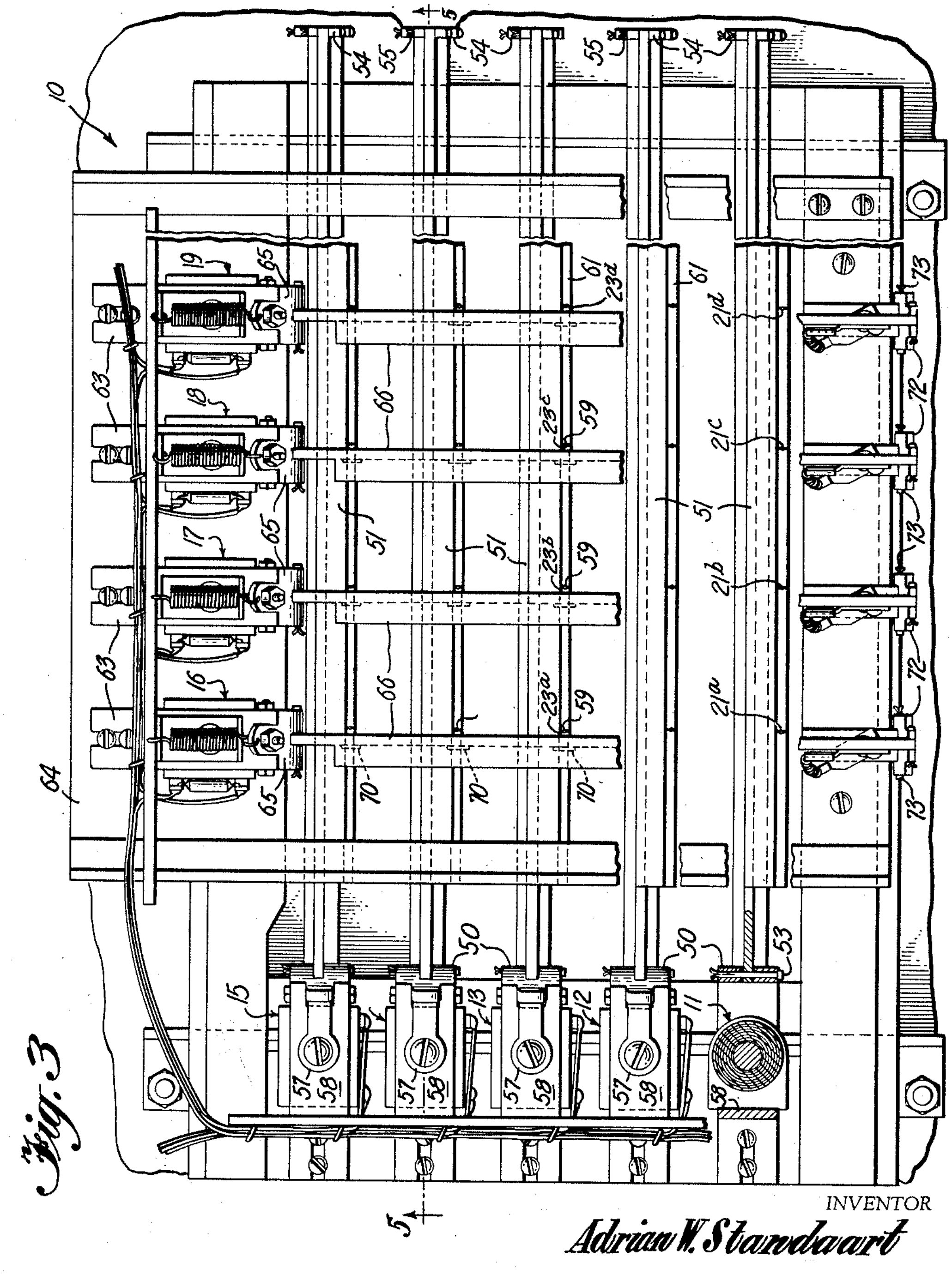
FIGURE 3 is a top plan view of the physical construction of the electromechanical memory or storage mechanism.
Figure 4:
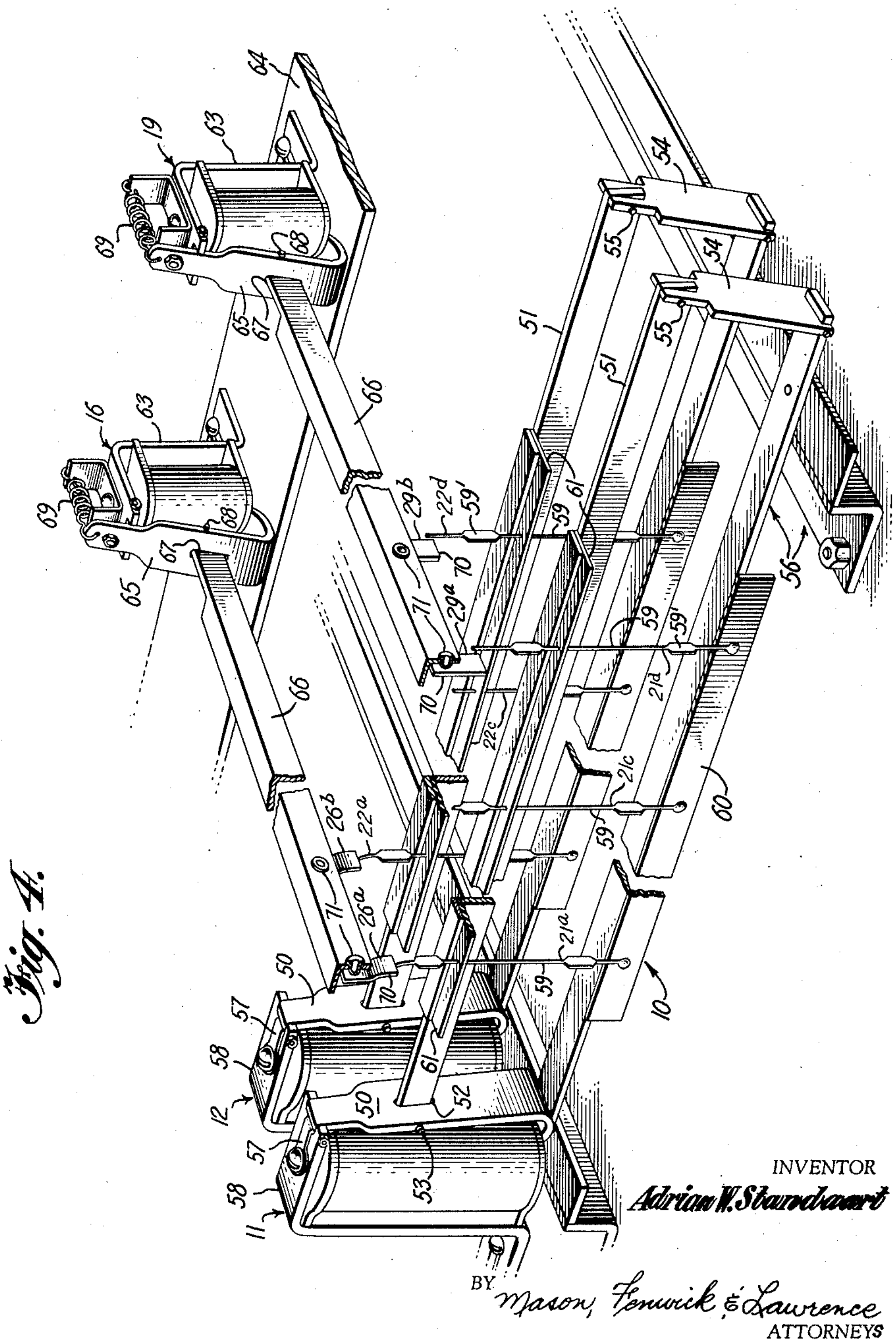
FIGURE 4 is a perspective view thereof with certain duplicate parts eliminated for clarity.

The physical structure of the setting mechanism by which the above-described movements and operation of the contacts is effected is illustrated particularly in FIGURES 3 to 5. In the perspective view of FIGURE 4, only entry contact shifting relays 11 and 12 and their associated series of contacts 21 and 22, and the exit contact shifting relays 16 and 19 and their associated series of contacts 26 and 29, are illustrated, for purposes of clarity.

The relays 11 to 15 are each provided with a pivoted armature 50 disposed alongside the coil of the relay and pivoted for movement in a vertical plane so that the armature 50 is drawn away from the contact network of the storage mechanism 10 and toward its associated relay on energizing the relay coil. A substantially horizontally disposed rail 51 projects through an opening 52 in each armature 50 and is pivotally coupled to the armature by a suitable pivot pin 53. The opposite end of the rails 51 lie in complementary recesses in pivotal link members 54 and are pivotally coupled thereto by means of pivot pins 55. The lower ends of the pivotal link members 54 are pivoted on a horizontal axis on a suitable base indicated generally by the reference character 56. A leaf spring 57 is mounted on the mounting bracket 58 for each of the relays 11 to 15 and bears against the pivoted armature 50 to resiliently bias the armature and its pivotally coupled rail 51 outwardly from its associated relay 11 to 15. The pivoted rails 51 coupled to each of the relays 11 to 15 are mounted in mutually parallel relationship and may be arbitrarily labeled the longitudinal rails.

The individual contact members of the series of entry contacts 21 to 25 are each comprised of a resilient, small diameter, conductive wire rod 59 rigidly mounted in an upright position on longitudinally extending conductive terminal panels indicated at 60 mounted on the base or supporting member 56 and each lying in a vertical plane substantially coincident with one lateral face of its associated rail 51. The conductive wire rods 59 extend upwardly through complementary apertures or recesses in guide member 61, formed of insulating material and rigidly mounted on the rails 51. The conductive wire rods 59 are preferably formed of platinum wire and are provided with a plurality of flattened portions 59′, preferably one disposed immediately above the terminal panel 60 and one immediately above the guide member 61, to impart flexibility to the conductive wire rods 59 along the direction of the longitudinal axis of the rail 51.

The exit contact shifting relays 16 to 20 are arranged on mounting brackets 63 disposed on a suitable supporting strip 64 forming a part of the base or supporting member 56 and elevated to a plane approximately coincident with the upper surface of the rails 51. Each of the relays 16 to 20 are provided with armatures 65 pivoted to the mounting bracket 63 for movement about horizontal axes. A plurality of substantially horizontally disposed, parallel rails 66, arranged along axes oriented transversely to the axes of the longitudinal rail 51, are provided, each being coupled to the armature 65 of each of the relays 16 to 20. The adjacent end of each of the rails 66 is projected through a suitable complementary aperture 67 in one of the armatures 65 and pivotally coupled to the armature by means of a pivot pin 68. A suitable coil spring 69 is coupled between the mounting bracket 63 and a portion of the armature 65 extending above its pivotal coupling with the bracket 63, to resiliently bias the armature 65 and its pivotally intercoupled rail 66 away from the relay coil.

The series of contact members 26 to 30, associated with the relays 16 to 20, respectively, are formed of substantially rectangular, electrically conductive strips 70, preferably formed of silver, which depends from the lower end of the rails 66 into the paths of the upper ends of the wire rods 59 forming the contact members 21 to 25. The contact strips 70 are rigidly anchored to the rails 66 by means of rivets 71 or the like, and are electrically coupled together in sets or series of contacts 26 to 30 by the electrically conductive rails 66, which in turn are connected through the leads 26′ to 30′, respectively to the exit hubs 41 to 45. The opposite ends of the rails 66 are pivotally linked to the base 56 in the same manner as the rails 51, by means of pivoted link members 72 having complementary recesses for accommodating the free ends of the rails 66, the rails 66 being pivotally coupled to the links 72 by means of a suitable pivot pin 73, and the links 72 being pivotally mounted on the base 56.

Upon electrical energization of any of the entry contact shifting relays 11–15, for example the relay 11, the armature 50 of the energized relay 11 will be magnetically drawn toward the relay coil, shifting the rails 51 associated therewith substantially longitudinally in the direction of the relay 11. The wire rods 59 forming the series of contacts 21*a*, 21*b*, 21*c*, 21*d* and 21*e* associated with the relay 11, which are disposed in the apertures in the guide members 61 of these rails, will be flexed in the direction of the relay 11. Such flexing of the wire rods 59 will bring them into contact with their associated contact strips 70 on the rail 66, representing the contact members 26*a*, 27*a*, 28*a*, 29*a* and 30*a*, but the contact strips 70 will limit movement of the upper ends of the wire rods 59 beyond this point.

Upon energization of one of the exit contact shifting relays, for example the relay 16, the relay coil 16 will magnetically draw its armature 65 and rail 66 in the direction of the relay and shift the contacts 26*a*, 26*b*, 26*c*, 26*d* and 26*e* laterally out of the path of the wire rods 59 forming contacts 21*a* to 21*e*. The coils of relay 11 being still energized, the upper ends of the wire rod contacts 21*a* will be drawn beyond the plane of contact strip 26*a* in the direction of the relay 11. Thus, on deenergizing relay 16 and return of the rail 66 intercoupled therewith to its normal position with contact strips 70 in the path of movement of their associated contact rods 59, under bias of the springs 69, and deenergizing of the relay 11, the wire rod contact member 21*a* will be prevented from returning to its normal position to the right of its associated contact strips 70, as viewed in FIGURE 3, the contacts 21*a* and 26*a* being maintained in circuit-making contact by virtue of the resiliency of the contact rods 59.

It will be apparent that with this electromechanical storage or memory device, any desired combination or program of connections between the entry and exit hubs of the group of hubs 36, 46, may be established by energizing the appropriate combination of entry contact shifting relays 11–15 and exit contact shifting relays 16–20 in properly timed relation to restrain, in circuit-making condition, the entry and exit contact members corresponding to the hubs to be interconnected. When it is desired to erase the program of entry and exit hub connections stored in the memory device 10, this can be readily accomplished by momentarily energizing each of the exit contact shifting relays 16–20, whereby the contact members 26–30 will all be withdrawn from the path of their corresponding entry contact members releasing any of the latter which were restrained in circuit-making condition to return under resilient bias to normal open-circuit condition.

Figure 2:
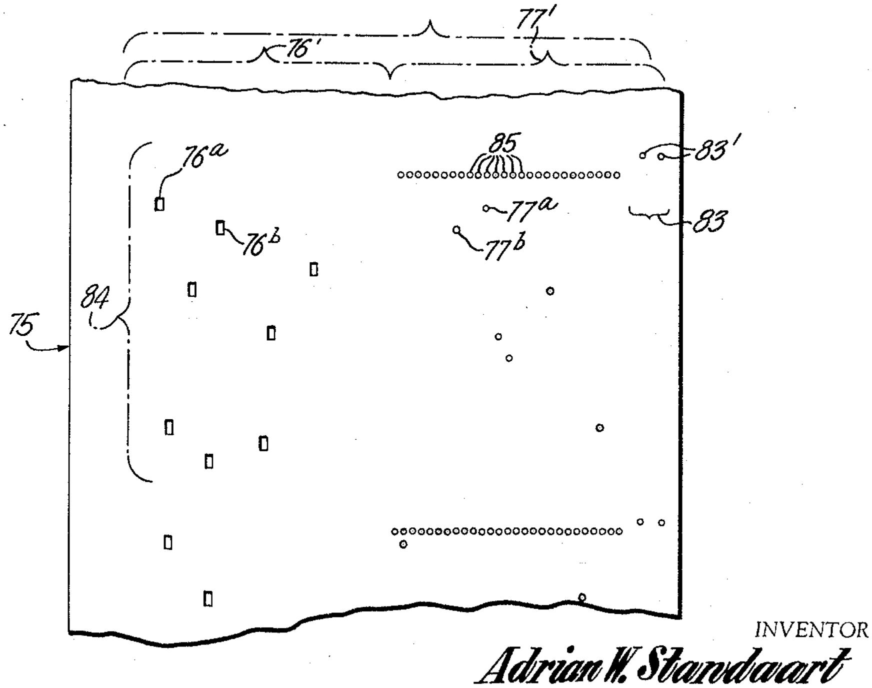
FIGURE 2 is a plan view of a section of paper tape which may be used to control the recording or erasure of a program in a memory apparatus.

One convenient form of means for recording a large number of different computer or data processing equipment programs and controlling the storage device 10 is illustrated in FIGURES 1 and 2. This computer program master records is in the form of a punched paper tape 75, having a series of punch positions spaced laterally across the tape equal to the total number of exit and entry hubs, plus several additional punch positions for control purposes. It will be recalled that the storage device 10 includes exit contact shifting relays, represented by the relays 16–20, corresponding in number to the number of exit hubs 41–45 encountered, and entry contact shifting relays represented by the relays 11–15 corresponding to the number of entry hubs 31–35 encountered. The master program record tape 75 will be pre-punched to set up the desired entry and exit hub connection program in the storage device 10 by providing punch holes such as the holes 76*a* and 76*b* and 77*a* and 77*b* in the tape. The punch holes 76*a* and 76*b* in the example herein shown are located in a zone 76′ of the tape allocated to control of the entry contact shifting relays 11–15 and the punch holes 77*a* and 77*b* are located in a zone 77′ allocated to control of the exit contact shifting relay 16–20.

The punch tape sensing mechanism may be of any conventional type previously known in the automatic data processing trade, and may, for example, include a supply reel 78 and a take-up reel 79 which are driven by suitable control means to draw the paper tape 75 through a sensing station 80. A suitable contact member 81, for example in the form of a curved contact plate which is connected to a voltage source, is located at the sensing station 80 in the path of the paper tape 75 and completely spans the width of the paper tape so that the tape will be drawn thereover. On the opposite side of the paper tape and spaced transversely thereof is a series of contact sensors 82 in the form of brushes or fingers, one which is located at each punch hole along the paper tape 75. The contact sensors are, in one example, formed of resilient electrically conductive material which is shaped to resiliently bias the contactor end of the sensor against the paper tape at the sensing station and toward the contact plate 81 so that the sensor projects through a punch hole into physical and electrical contact with the contact plate 81 when a punch hole moves into registry with the sensor. The contact sensors 82 located in the zone 76′ of the paper tape are connected respectively to one of the entry contact shifting relays 11–15 and each of these contact sensors 82 located in the zone 77′ are electrically connected to one of the exit contact shifting relays 16 to 20. The other terminal of each of the relays 11 to 20 may be connected together to ground. It will be noted that the punch holes in the zone 76′ of the paper tape 75 are, in the embodiment illustrated, in the form of elongated slots while the punch holes 77*a* and 77*b* in the zone 77′ are in the form of circular holes aligned transversely with about the mid point of the corresponding slot in the zone 76′. The slots 76*a* and 76*b* will cause the entry contact shifting relays in the series 11 to 15 connected with the contact sensors 82 aligned with the path of travel of the punch hole slots 76*a*, 76*b* to be energized slightly before energization of the exit contact shifting relays of the series 16 to 20, affected by the punch holes 77*a* and 77*b*. This will cause the series of entry contact members controlled by each energized entry contact shifting relay 11 to 15 to be drawn toward their associated relay coils before activation of the exit contact shifting relay controlling the exit contact member to be conditioned in circuit-making relation with one of the entry contact members so that the entry contact shifting relay in the series 16 to 20 is energized and deenergized to reciprocate its associated entry contact members while the companion entry contact shifting relay is still energized. This insures that the exit contact member to be conditioned in circuit-making relation with the entry contact member is withdrawn from and returned into the return path of the entry contact member before the entry contact member is released by deenergization of its control relay to resiliently return to normal position.

It will be appreciated that a large number of different programs for entry and exit hub connections may be prepunched into the paper tape 75 so that the owner or lessee of the computer equipment can have available a master record from which he can readily set into the storage device 10 any one of the desired programs recorded on the tape 75, and thereby connect the hubs to cause the computer to perform the desired functions dictated by the program of connections. In one practical form of the invention, the paper tape 75 may have an indexing zone, indicated by the reference character 83, to one side of the zones 76 and 77, preferably along the margin of the tape, which includes a plurality of tracks or punch positions to receive combinations of punch holes 83′ distinctively identifying each program recorded in the tape in accordance with a selected code. The indexing zone punch holes 83′ will be identified by sensors similar to those used for the other punch positions to produce electrical signals for activating suitable indicator means for indicating the identity of the associated program, and will, for example, be located beside and slightly in advance of the group of punch holes, indicated as a group by the reference character 84, constituting the complete program of entry and exit hub connections identified by the juxtaposed indexing punch holes 83′. As is illustrated in FIGURE 2, the first transverse row of each program group 84 may have a series of punch holes 85 at every sensor position or track in the zone 77′ to initially energize each of the exit contact shifting relays 16–20 and thereby return the entire storage or memory device 10 to reset condition where all of its contact members are in open-circuit condition relative to their mates, so as to insure that all elements of the previously stored code or program are cleared or erased before recording the new program.

Obviously, other specific types of punch tapes or punch cards, or magnetic tapes, may be employed instead of the master paper tape 75 specifically described herein, the particular disposition of the code elements over the tape area, the particular sensor means employed to respond to the intelligence denoting bits or code elements recorded on the tape, and the particular means actuated responsive to the sensing of these bits or code elements to activate the relays 11–20 being matters which are subject to substantial variation but which make use of devices or techniques well known in the pertinent arts.

Further, instead of using a punched paper tape as a master record of the hub connection patterns to condition the electromechanical storage device, one may substitute a telephone dial impulsing device which produces a different number of electrical pulses for each dial position in conjunction with a translator network of conventional design responsive to different combinations of dialed pulse trains to route voltage to any selected one of a plurality of independent circuits, which in this case, would route energizing voltage to selected ones of the entry or exit contact shifting relays 11–20 in accordance with a selected code. with such an arrangement, a person desiring to set a pattern of entry and exit hub connections into the electromechanical storage device 10 may activate the telephone dial of the impulsing device in accordance with a previously selected code to produce dial pulse trains for activating the translator network to energize combinations of entry contact shifting relays 11 to 15 and exit contact shifting relays 16 to 20 to set up a complete program of hub connections. The operator will work from a master book or written listing of the combinations of dial numbers to be dialed for establishing many different computer programs. The translator network may be so designed that it will respond to one particular selected dialed number to energize all of the exit contact shifting relays 16–20 and thereby reset the unit prior to recording of another hub connection program.

In still another modification, the entry and exit contact shifting relays 11 to 20 may be dispensed with, and a pneumatic system for moving the rails 51 and 66 substituted therefor. In such a pneumatic actuating system, the electrically conductive sensors 82 would be connected with solenoid valves which would regulate the application of pneumatic pressure from a suitable compressed air source or the like to pneumatic cylinders. A pneumatic cylinder would be substituted for each of the relays 11 to 20, with the piston rod of each cylinder coupled to an associated one of the rails 51 or 66 to reciprocate the associated rail and set of contact members. When a punch hole in the record tape passes into registry with a sensor 82, current flowing from the contact member 81 to the associated solenoid controlled valve would actuate the valve in a direction to apply air pressure to a selected one of the pneumatic cylinders to shift the associated rail and contact members in a manner similar to the movement of these elements effected by the contact shifting relays 11 to 20. Passage of the punch hole out of registry with the sensor will remove the current supply to the solenoid controlled valve and cause it to be actuated in a direction to cause the piston and intercoupled rail of the associated pneumatic cylinder to be returned to normal position.

It will be apparent that other modifications may be made within the spirit and scope of the present invention, and it is desired, therefore, that only such limitations be placed on the invention as are imposed by the prior art and set forth in the appended claims.

What is claimed is:

1. In a data storage system, a changeable storage device for storing program-representing patterns of connections between entry and exit hubs of entry and exit sections of an electronic computer program panel or the like wherein the stored patterns may be readily changed into other desired patterns, comprising a plurality of contacts disposed in a network arrangement of two distinct groups of multicontact sets of contacts arranged along intersecting perpendicular and parallel axes forming a grid pattern, the sets of one group each including a plurality of first contacts supported for movement from a normal position to a displaced position along a first set of parallel axes, a plurality of second contacts each paired with a different one of said first contacts supported for movement along a second set of axes and perpendicular to and intersecting said first set of axes from a normal position disposed in the path of movement of its paired first contact spaced out of contact therewith between the normal and displaced positions thereof and a displaced position laterally offset from the path of movement of its paired first contact, the number of multicontact sets of said first contacts corresponding to the number of entry hubs in said entry control panel section, each of said sets having a number of first contacts connected in common to a different one of the entry hubs and corresponding to the number of exit hubs in the exit control panel section, the number of multicontact sets of said second contacts corresponding to the number of exit hubs in said exit sections, each having a number of second contacts corresponding in number to the number of entry hubs and connected in common to a different one of the exit hubs, means responsive to distinctive control signals for activating selected ones of said sets of first and second contacts along their respective axes of movement in timed relation to dispose any selected one of said second contacts in the return path of movement of its paired first contact from the displaced to the normal position thereof when the paired first contact occupies its displaced position, and means for shifting the selected first contact into circuit-making engagement with its paired second contact and maintaining such paired contacts in circuit-making condition upon deactivation of the means responsive to said distinctive control signals.

2. In a data storage system, a changeable storage device for storing program-representing patterns of connections between entry and exit hubs of entry and exit sections of an electronic computer program panel or the like wherein the stored patterns may be readily changed into other desired patterns, selective control means for applying distinctive control signals to said storage device representing patterns of connections to be stored therein, said storage device comprising a plurality of multicontact groups of contacts, each group including a plurality of first contact members resiliently biased to a normal position and movable along a common working axis to a displaced position, the working axes of said groups of first contact members being arranged in laterally spaced relation parallel with each other and each group of first contact members being electrically connected to a different one of the entry hubs of the entry section, another plurality of multicontact groups of contacts each group including a plurality of second contact members having a normal position and movable along a common working axis to a displaced position, the working axes of said groups of second contact members being in laterally spaced relation parallel with each other and perpendicular to the working axes of said groups of first contact members and intersecting the same, each of said first contact members being paired with a different one of said second contact members and each group of second contact members being electrically connected to a different one of the exit hubs of the exit section, said second contact members at their normal positions being disposed in the path of movement of their paired first contact members spaced out of contact therewith between the normal and displaced positions of said paired first contact members and being spaced at their displaced positions out of the path of their paired second contact members, means responsive to distinctive control signals for selectively activating any group of the said first contact members toward their displaced positions, and means responsive to other distinctive control signals for selectively activating any group of the said second contact members toward their displaced positions in timed relation to activation of said first contact members to reciprocate a selected second contact member out of the path of its paired first contact member to permit movement of the latter to its displaced position and to return the selected second contact member into the return path of the paired first contact member whereby the selected first contact member intercepts and restrains the selected second contact member in circuit-making contact therewith upon deactivation of the means for activating said contact members.

3. In a data processing system, a storage device as defined in claim 2, wherein said first contact members are elongated electrical conductors flexible transversely of the longitudinal axes thereof each having an anchored portion fixed to a stationary support and a free end portion spaced therefrom movable along one of said common working axes between said normal and displaced positions, said means for activating said first contact members including means coupled to said flexible conductors at points spaced from said anchored portions for flexing said free end portions between said normal and displaced positions, and said second contact members comprising electrically conductive strips disposed when at their normal positions to intercept said free end portions of said flexible conductors during movement of the latter toward their displaced positions and prevent further movement of the free end portions of their paired first contact members toward the displaced positions of the latter, and said conductive strips when in their normal positions intercepting and restraining in contact therewith the free end portions of any of said flexible conductors which attain their displaced positions upon deactivation of the means for activating said first contact members.

4. In a data processing system, a storage device as defined in claim 2, wherein said means for activating the said first contact members comprises a plurality of entry contact control relays and said means for activating the said second contact members comprises a plurality of exit contact control relays, a plurality of contact control bars reciprocative axially and arranged along first and second intersecting sets of parallel axes forming a rectangular grid network, each group of said contact members being arranged along a different one of said control bars and controlled by the movement thereof, means intercoupling said entry contact control relays with the control bars arranged along said first set of parallel axes and said exit contact control relays with the control bars arranged along said second set of parallel axes, the said entry contact control relays being disposed in laterally spaced relation along one side of the said grid network, the said exit contact control relays being disposed in laterally spaced relation along another side of the said grid network.

5. In a data processing system, a storage device as defined in claim 2, wherein said selective control means comprises a record tape holding at least one record of exit and entry terminal-connections for the said control panel in the form of distinguishable bits of information in selected zones of the said tape, and sensor means for detecting the bits recorded on the tape and transmitting activating signals to the said control relays in preselected relation to the positions of the bits to energize the control relays in timed relation.

References Cited by the Examiner

UNITED STATES PATENTS

| | | | |
|---|---|---|---|
| 367,332 | 7/87 | Baxter | 340—166 |
| 1,168,419 | 1/16 | Reynolds | 179—27.54 |
| 1,547,964 | 7/25 | Semat | 340—166 |
| 1,962,335 | 6/34 | Wensley | 340—147 |
| 2,348,680 | 5/44 | Hanson et al. | 340—147 |
| 2,386,482 | 10/45 | Leathers et al. | 340—147 |
| 2,866,176 | 12/58 | Durfee et al. | 340—173 |
| 2,867,790 | 1/59 | Durfee et al. | 340—173 |
| 2,877,447 | 3/59 | Kenrich et al. | 340—166 X |

NEIL C. READ, *Primary Examiner.*

IRVING L. SRAGOW, *Examiner.*